United States Patent
Park et al.

(10) Patent No.: US 10,177,376 B2
(45) Date of Patent: Jan. 8, 2019

(54) CATHODE ACTIVE MATERIAL AND LITHIUM SECONDARY BATTERY INCLUDING THE SAME

(71) Applicant: LG Chem, Ltd., Seoul (KR)

(72) Inventors: Byung Chun Park, Daejeon (KR); Seong Hoon Kang, Daejeon (KR); Minsuk Kang, Daejeon (KR); Wang Mo Jung, Daejeon (KR); Ho Suk Shin, Daejeon (KR); Sang Min Park, Daejeon (KR); Geungi Min, Daejeon (KR)

(73) Assignee: LG Chem, Ltd. (KR)

( * ) Notice: Subject to any disclaimer, the term of this patent is extended or adjusted under 35 U.S.C. 154(b) by 277 days.

(21) Appl. No.: 14/559,162

(22) Filed: Dec. 3, 2014

(65) Prior Publication Data

US 2015/0090927 A1 Apr. 2, 2015

Related U.S. Application Data

(63) Continuation of application No. PCT/KR2013/005933, filed on Jul. 4, 2013.

(30) Foreign Application Priority Data

Jul. 9, 2012 (KR) .................. 10-2012-0074262

(51) Int. Cl.
| | | |
|---|---|---|
| *H01M 4/48* | (2010.01) | |
| *H01M 4/505* | (2010.01) | |
| *H01M 4/525* | (2010.01) | |
| *C01G 53/00* | (2006.01) | |
| *C01G 45/12* | (2006.01) | |
| *H01M 10/0525* | (2010.01) | |

(52) U.S. Cl.
CPC ........ *H01M 4/505* (2013.01); *C01G 45/1242* (2013.01); *C01G 53/44* (2013.01); *C01G 53/54* (2013.01); *H01M 4/525* (2013.01); *C01P 2004/84* (2013.01); *C01P 2006/40* (2013.01); *H01M 10/0525* (2013.01); *H01M 2220/20* (2013.01); *Y02E 60/122* (2013.01); *Y02P 70/54* (2015.11)

(58) Field of Classification Search
CPC ............ H01M 4/48; H01M 4/50; H01M 5/52; H01M 4/131; H01M 4/485; H01M 4/525
See application file for complete search history.

(56) References Cited

U.S. PATENT DOCUMENTS

| | | | |
|---|---|---|---|
| 6,730,435 B1 | 5/2004 | Nakane et al. | |
| 9,496,551 B2 | 11/2016 | Koga et al. | |
| 2003/0013017 A1 | 1/2003 | Nagayama et al. | |
| 2010/0288969 A1 | 11/2010 | Koga et al. | |
| 2011/0027651 A1* | 2/2011 | Sun .................. | C01B 15/00 429/220 |
| 2012/0043499 A1* | 2/2012 | Shin ................. | C01D 15/02 252/182.1 |
| 2013/0266868 A1* | 10/2013 | Sun .................. | H01M 4/131 429/223 |

FOREIGN PATENT DOCUMENTS

| | | |
|---|---|---|
| CN | 1294417 A | 5/2001 |
| CN | 101855754 A | 10/2010 |
| CN | 102054985 A | 5/2011 |
| JP | H11307094 A | 11/1999 |
| KR | 10-0453595 B1 | 10/2004 |
| KR | 2006-0130964 A | 12/2006 |
| KR | 20060130964 A | 12/2006 |
| KR | 10-0864199 B1 | 10/2008 |
| KR | 2010-0085950 A | 7/2010 |
| KR | 2012-0009779 A | 2/2012 |

OTHER PUBLICATIONS

Machine translation of KR1020120009779.*
Search Report from European Application No. 13817450.3, dated Nov. 23, 2016.
Noguchi et al., "Effect of Bi oxide surface treatement on 5V spinel LiNi0.5Mn1.5-xTixO4." Journal of Power Sources, Elsevier SA, CH, vol. 174, No. 2, Dec. 6, 2007, pp. 359-365.
Internationational Search Report from PCT/KR2013/005933, dated Oct. 11, 2013.

* cited by examiner

*Primary Examiner* — Haidung D Nguyen
(74) *Attorney, Agent, or Firm* — Lerner, David, Littenberg, Krumholz & Mentlik, LLP

(57) ABSTRACT

Disclosed are a cathode active material including a lithium transition metal oxide based on at least one transition metal selected from the group consisting of Ni, Mn and Co, wherein at least one hetero element selected from the group consisting of Ti, Co, Al, Cu, Fe, Mg, B, Cr, Bi, Zn and Zr is located at a surface portion of or inside the lithium transition metal oxide, and a secondary battery including the same. The cathode active material according to the present invention includes predetermined hetero elements at a surface thereof and therein, and, as such, a secondary battery based on the cathode active material may exhibit excellent high-speed charge characteristics and lifespan characteristics.

3 Claims, No Drawings

CATHODE ACTIVE MATERIAL AND LITHIUM SECONDARY BATTERY INCLUDING THE SAME

CROSS REFERENCE TO RELATED APPLICATIONS

The present application is a continuation of International Application No. PCT/KR2013/005933 filed Jul. 4, 2013, which claims the benefit of the filing date of Korean Patent Application No. 10-2012-0074262 filed Jul. 9, 2012, the disclosures of which are hereby incorporated herein by reference.

TECHNICAL FIELD

The present invention relates to a cathode active material and a lithium secondary battery including the same. More particularly, the present invention relates to a cathode active material including a lithium transition metal oxide based on at least one transition metal selected from the group consisting of Ni, Mn and Co, wherein at least one hetero element selected from the group consisting of Ti, Co, Al, Cu, Fe, Mg, B, Cr, Bi, Zn and Zr is located at a surface portion of or inside the lithium transition metal oxide, and a lithium secondary battery including the same.

BACKGROUND ART

As mobile device technology continues to develop and demand therefor continues to increase, demand for secondary batteries as energy sources is rapidly increasing. Among these secondary batteries, research on lithium secondary batteries, which exhibit high energy density and discharge voltage, has been underway and such lithium secondary batteries are commercially available and widely used. Such lithium secondary batteries are the most widely used due to excellent electrode lifespan and high high-speed charge and discharge efficiency.

Generally, as cathode active materials for lithium secondary batteries, lithium-containing cobalt oxides such as $LiCoO_2$ are mainly used. In addition, use of lithium-containing manganese oxides such as $LiMnO_2$ having a layered crystal structure, $LiMn_2O_4$ having a spinel crystal structure, and the like and lithium-containing nickel oxides such as $LiNiO_2$ is also under consideration.

Among cathode active materials, $LiCoO_2$ is widely used due to excellent overall physical properties such as excellent cycle properties, and the like. However, $LiCoO_2$ is low in safety and expensive due to resource limitations of cobalt as a raw material. Lithium nickel based oxides such as $LiNiO_2$ are cheaper than $LiCoO_2$ and exhibit high discharge capacity when charged to a voltage of 4.25 V. However, lithium nickel based oxides have problems such as high production cost, swelling due to gas generation in batteries, low chemical stability, high pH and the like.

In addition, lithium manganese oxides, such as $LiMnO_2$, $LiMn_2O_4$, and the like, are advantageous in that they contain Mn, which is an abundant and environmentally friendly raw material. In particular, among the lithium manganese oxides, $LiMn_2O_4$ has advantages such as a relatively cheap price, high output and the like. On the other hand, $LiMn_2O_4$ has lower energy density, when compared with $LiCoO_2$ and three component-based active materials.

To overcome these drawbacks, some Mn of $LiMn_2O_4$ is substituted with Ni and thereby a spinel material having a composition of $Li_{1+a}Ni_xMn_{2-x}O_{4-z}$ ($0 \leq a \leq 0.1$, $0.4 \leq x \leq 0.5$, and $0 \leq z \leq 0.1$) has a higher potential (approximately 4.7 V) than original operating potential (approximately 4 V), and, accordingly, the spinel material is well suited to use as a cathode active material of medium and large lithium secondary batteries used in EVs requiring high energy and high-output performance. However, due to high charge and discharge voltage potential, there are a variety of problems, which must be solved, such as reduced battery performance caused by Mn dissolution of the cathode active material and side reaction of an electrolyte.

Therefore, there is a need to develop an excellent cathode active material having excellent high-speed charging characteristics not while causing the problems.

DISCLOSURE

Technical Problem

The present invention aims to address the aforementioned problems of the related art and to achieve technical goals that have long been sought.

As a result of a variety of extensive and intensive studies and experiments, the inventors of the present invention developed a cathode active material including a lithium transition metal oxide, wherein predetermined hetero elements are located at a surface portion of and inside the lithium transition metal oxide, and confirmed that, when the cathode active material is used, excellent high-speed charge characteristics and lifespan characteristics are exhibited, thus completing the present invention.

Technical Solution

In accordance with one aspect of the present invention, provided is a cathode active material including a lithium transition metal oxide based on at least one transition metal selected from the group consisting of Ni, Mn and Co, wherein at least one hetero element selected from the group consisting of Ti, Co, Al, Cu, Fe, Mg, B, Cr, Bi, Zn and Zr locates at a surface portion of or inside the lithium transition metal oxide.

The cathode active material according to the present invention includes a lithium transition metal oxide including predetermined hetero elements in a specific form and, as such, may suppress elution of manganese and gas generation by decomposition of an electrolyte under high voltage.

The hetero elements may be included in an amount of 0.001 to 10 wt % based on the total weight of the lithium transition metal oxide. When the amount of the hetero elements is less than 0.001 wt %, effects by addition of the hetero elements is not sufficiently exhibited. On the other hand, when the amount of the hetero elements exceeds 10 wt %, inner resistance of a battery is increased and, as such, battery performance may be deteriorated. More particularly, the hetero elements may be included in an amount of 0.001 to 5 wt %.

At least one hetero element may be doped inside the lithium transition metal oxide. In this case, the hetero elements may be uniformly doped inside the lithium transition metal oxide.

Here, the "the hetero elements are "uniformly" doped inside the lithium transition metal oxide" means that a ratio of the hetero elements and the other elements are identical in every area inside the lithium transition metal oxide.

In the present invention, "a surface portion of the lithium transition metal oxide" means a portion that is approximately less than 1% from the outest portion based on a diameter of the lithium transition metal oxide particle.

The amount of hetero elements locating at a surface portion of the lithium transition metal oxide particle may be in a range of 30% to 99.9%, particularly 50% to 98%, more particularly 50% to 95%, based on the total amount of the hetero elements.

In this case, the total amount of the hetero elements locating inside the lithium transition metal oxide particle is determined by subtracting the amount of the hetero elements locating at a surface portion from the total amount of the hetero elements and corresponds to the amount of the hetero elements locating at a surface portion. The total amount of the hetero elements locating inside the lithium transition metal oxide particle may be in a range of 0.1% to 70%, particularly 2% to 50%, more particularly 5% to 50%.

The hetero elements may be located at a surface portion of and inside the lithium transition metal oxide through physical concrescence and/or chemical bonding.

When the hetero elements exist at a surface portion of and inside the lithium transition metal oxide at the same time, the hetero elements may exist in a relatively high amount at a surface portion of the lithium transition metal oxide and in a relatively low amount inside the lithium transition metal oxide.

As one embodiment, the lithium transition metal oxide may be represented by Formula 1 below.

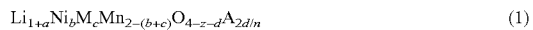

$$Li_{1+a}Ni_bM_cMn_{2-(b+c)}O_{4-z-d}A_{2d/n} \qquad (1)$$

Wherein M is at least one selected from the group consisting of Ti, Co, Al, Cu, Fe, Mg, B, Cr, Bi, Zn, and Zr; A is at least one selected from the group consisting of O, OH, $SO_4$, $PO_4$, $NO_3$, $CO_3$, $BO_3$, and F; $0 \le a \le 0.1$; $0.3 \le b \le 0.6$; $0.005 \le c \le 0.1$; $0 \le z \le 0.1$; $0.005 \le d \le 0.1$; and n is an oxidation number of A.

In particular, M may be at least one selected from the group consisting of Al and Ti, and the amount of nickel (b) may be 0.4 to 0.5.

A method of preparing the lithium transition metal oxide according to the present invention includes mixing and then sintering the lithium-containing material after reacting a transition metal precursor with $M_{x'}A_{y'}$ of 0.001 to 2.0 mol %, particularly 0.001 to 0.9 mol %.

The transition metal precursor may be, for example, at least one selected from the group consisting of a mixed oxide, a mixed hydrate, a mixed oxohydroxide, a mixed carbonate, a mixed hydrogen carbonate, and a mixed lithium transition metal oxide, as a Mn—Ni-containing precursor.

The transition metal precursor may be prepared by co-precipitation. The co-precipitation is broadly known in the art and thus detailed description thereof is omitted.

The lithium-containing material, which is not specifically limited, may be, for example, lithium hydroxide, lithium carbonate, lithium oxide and the like, particularly lithium carbonate ($Li_2CO_3$) and/or lithium hydroxide (LiOH).

M is at least one selected from the group consisting of Ti, Co, Al, Cu, Fe, Mg, B, Cr, Bi, Zn, and Zr; A is at least one selected from the group consisting of O, OH, $SO_4$, $PO_4$, $NO_3$, $CO_3$, $BO_3$, and F; and, when $0<x'<4$ and $0<y'<4$, an oxidation number of M times x' plus an oxidation number of A times y' may be 0. In particular, $M_{x'}A_{y'}$ may be at least one selected from the group consisting of $TiO_2$, $Co_3O_4$, $Al_2O_3$, CuO, $Fe_2O_3$, $Fe_3O_4$, MgO, $B_2O_3$, $Cr_2O_3$, $Ti(SO_4)_2$, $CoSO_4$, $Al_2(SO_4)_3$, $CuSO_4$, $FeSO_4$, $MgSO_4$, $Ti_3(PO_4)_4$, $CoPO_4$, $AlPO_4$, $Mg_3(PO_4)_2$, $TiF_4$, $CoF_3$, $AlF_3$, $CuF_2$, $FeF_3$, $Al(NO_3)_3$ and $MgF_2$, but the present invention is not limited thereto.

When $M_{x'}A_{y'}$ is dissolved in water, precipitates are formed on a surface of a precursor. More particularly, $M_{x'}A_{y'}$ dissolved in water or sodium hydroxide in a range of 0.001 to 2.0 mol % is added to a reactor and thereby may react with the transition metal precursor, resulting in formation of a transition metal precursor surface-treated with M.

In one preferred embodiment, in the co-precipitating, an additive and/or alkali carbonate which may form a complex with a transition metal may be further added. The additive may be, for example, an ammonium ion source, ethylenediamine compounds, citric acid compounds or the like. The ammonium ion source may be, for example, aqueous ammonia, aqueous ammonium sulfate solution, aqueous ammonium nitrate solution or the like. The alkali carbonate may be selected from the group consisting of ammonium carbonate, sodium carbonate, potassium carbonate and lithium carbonate. In this case, as desired, two or more carbonates from the group may be selected and mixed. Addition amounts of the additive and alkali carbonate may be properly determined considering the amount of the transition metal-containing salt, pH and the like.

When the transition metal precursor surface-treated with the hetero elements M formed according to the reaction described above is reacted through calcination with the lithium-containing material, the hetero elements M may diffuse inside particles during calcination reaction, and, as such, a lithium transition metal oxide, in which the amount of the hetero elements is different between a surface portion of the lithium transition metal oxide and an inner portion of the lithium transition metal oxide, may be prepared.

When the above calcination reaction is compared to coating a lithium transition metal oxide with hetero elements, in the lithium transition metal oxide prepared according to the present invention, the hetero elements M are located at a surface portion of and inside particles of the lithium transition metal oxide, and thereby, structural stability of the lithium transition metal oxide is increased, and, accordingly, structural collapse, decomposition and the like under a high voltage condition may be prevented.

That is, in the lithium transition metal oxide according to the present invention, predetermined hetero elements locate at a surface portion of and inside particles of the lithium transition metal oxide, and thereby, reaction of a cathode and an electrolyte may be suppressed. In addition, as described above, structural stability of a lithium transition metal oxide is increased and thereby, structural collapse, decomposition reaction and the like under a high voltage condition may be prevented. Accordingly, when the lithium transition metal oxide according to the present invention is used in a lithium secondary battery as an electrode active material, high-speed charge performance is enhanced, and excellent lifespan characteristics, and charge and discharge efficiency are exhibited.

The lithium transition metal oxide is used as an active material for lithium secondary batteries. The lithium composite transition metal oxide may be separately used or may be used by mixing with other publicly known active materials for lithium secondary batteries.

The present invention also provides a cathode including the lithium transition metal oxide as a cathode active material and a lithium secondary battery including the same.

For example, the cathode is prepared by drying after coating a mixture of the cathode active material according to the present invention, a conductive material and a binder on a cathode current collector. In this case, as desired, the mixture may further include a filler.

The cathode current collector is generally fabricated to a thickness of 3 to 500 micrometers. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 20 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; and polyphenylene derivatives.

The binder is a component assisting in binding between an active material and the conductive material and in binding of the active material to a current collector. The binder is typically added in an amount of 1 to 20 wt % based on the total weight of the mixture including the cathode active material. Examples of the binder include, but are not limited to, polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

Generally, the lithium secondary battery includes the cathode, an anode, a separator and a lithium salt-containing non-aqueous electrolyte. The other components of the lithium secondary battery according to the present invention will be described below.

The anode may be prepared by coating and drying an anode material on an anode current collector. As desired, the anode material may further include the above-described components.

Examples of the anode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and may be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

A lithium salt-containing non-aqueous electrolyte consists of a non-aqueous electrolyte and lithium. As the non-aqueous electrolyte, a non-aqueous electrolyte solution, a solid electrolyte or the like may be used.

Examples of the non-aqueous electrolyte solution include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas.

In addition, the present invention also provides a battery module including the lithium secondary battery as a unit battery and a battery pack including the battery module.

The battery pack may be used as a power source of medium and large devices that require high-temperature stability, long cycle characteristics, high rate characteristics, and the like.

Preferable examples of the medium and large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

MODE FOR INVENTION

Now, the present invention will be described in more detail with reference to the accompanying drawings. These examples are provided for illustrative purposes only and should not be construed as limiting the scope and spirit of the present invention.

Preparation Example 1

<Preparation of Nickel-Manganese Composite Transition Metal Precursor>

After filling a 3 L wet reactor tank with 2 L of distilled water, nitrogen gas was continuously added to the tank at a rate of 1 L/min to remove dissolved oxygen. Here, the temperature of distilled water in the tank was maintained at 45 to 50 using a temperature maintenance device. In addition, the distilled water in the tank was stirred at 1000 to 1200 rpm using an impeller connected to a motor installed outside the tank.

Nickel sulfate, titanium sulfate and manganese sulfate were mixed in a ratio (molar ratio) of 0.25:0.04:0.71 to prepare a 2 M aqueous transition metal solution. Separately, a 4 M aqueous sodium hydroxide solution was prepared. The aqueous transition metal solution was continuously pumped into the wet reactor tank, using a metering pump, at a rate of 0.18 L/hr. The aqueous sodium hydroxide solution was pumped in a rate-variable manner by a control unit for adjusting a pH of the distilled water in the tank such that the distilled water in the wet reactor tank was maintained at a pH of 10.5 to 11.0. In this regard, a 30% ammonia solution as an additive was continuously co-pumped into the reactor at a rate of 0.035 L/hr to 0.04 L/hr.

Flow rates of the aqueous transition metal solution, the aqueous sodium hydroxide solution and the ammonia solution were adjusted such that an average residence time of the solutions in the wet reactor tank was approximately 6 hours. After the reaction in the tank reached a steady state, reaction was allowed to proceed for a certain time to synthesize a composite transition metal precursor with a higher density.

<Surface-Treatment with Titanium>

After reaching the steady state, the nickel-titanium-manganese composite transition metal precursor slurry, which was prepared by 20-hour continuous reaction of transition metal ions of the aqueous transition metal solution, hydroxide ions of the sodium hydroxide and ammonia ions of the ammonia solution, was transferred to a second 2 L wet reactor tank through an overflow pipe installed on the top side of the tank. Here, to the second 2 L wet reactor tank, nitrogen gas was continuously added to prevent oxidation of the precursor, and a temperature of a reactant was maintained to 45 to 50° C. using a temperature maintenance device. In addition, the precursor slurry in the tank was stirred at 1000 to 1200 rpm using an impeller connected to a motor installed outside the tank 0.015 M titanium sulfate was dissolved in distilled water to prepare an aqueous metal solution for surface treatment and, separately, a 0.06 M aqueous sodium hydroxide solution was prepared. The aqueous metal solution for surface treatment was continuously pumped into the second wet reactor tank at a rate of 0.18 L/hr. The aqueous sodium hydroxide solution was pumped in a rate-variable manner by a control unit for adjusting a pH of the distilled water in the tank such that the distilled water in the wet reactor tank was maintained at a pH of 10.5 to 11.0.

A precursor slurry, surface-treatment of which had been completed in the second wet reactor, was continuously obtained through an overflow pipe. The obtained surface-treated composite transition metal precursor was washed with distilled water several times and then dried in a 120 constant temperature dryer for 24 hours. As a result, a nickel-manganese composite transition metal precursor surface-treated with titanium was obtained.

Example 1

The nickel-manganese composite transition metal precursor surface-treated with titanium prepared according to Preparation Example 1 was mixed with $Li_2CO_3$ in a stoichiometric ratio and then the resulting mixture was sintered at 1000° C. for 10 hours, resulting in preparation of a lithium transition metal oxide.

Example 2

A lithium transition metal oxide was prepared in the same manner as in Example 1, except that, in Preparation Example 1, aluminum nitrate as a raw material for surface treatment was used.

Example 3

A lithium transition metal oxide was prepared in the same manner as in Example 1, except that, in Preparation Example 1, aluminum nitrate and ammonium fluoride as a raw material for surface treatment were used.

Comparative Example 1

A lithium transition metal oxide was prepared in the same manner as in Example 1, except that, in Preparation Example 1, a process of surface-treating with titanium was omitted <Experimental Example 1> Initial Charge and Discharge Characteristics A cathode using the lithium transition metal oxide prepared according to each of Examples 1 to 3 and Comparative Example 1, lithium metal foil as a counter electrode (i.e., an anode), a polyethylene membrane as a separator (Celgard, thickness: 20 μm), and a liquid electrolyte containing 1 M LiPF6 dissolved in a mixed solvent of ethylene carbonate, dimethylene carbonate, and diethyl carbonate in a volume ratio of 1:2:1 were used to manufacture a 2016 coin cell.

Charge and discharge characteristics of a coin cell manufactured using each of the lithium transition metal oxides prepared according to Examples 1 to 3 and Comparative Example 1 were evaluated by charging and discharging once in a voltage range of 3.5 to 4.9 V at a current of 0.1 C. Results are summarized in Table 1 below.

TABLE 1

| | Initial charge capacity (mAh/g) | Initial discharge capacity (mAh/g) | Initial charge and discharge efficiency (%) |
|---|---|---|---|
| Example 1 | 147.7 | 138.5 | 93.8 |
| Example 2 | 146.9 | 138.7 | 94.4 |
| Example 3 | 147.6 | 142.3 | 96.4 |
| Comparative Example 1 | 147.3 | 138.6 | 94.1 |

<Experimental Example 2> High-Speed Charge Characteristics

High-speed charge characteristics of a coin cell manufactured using each of the lithium transition metal oxides prepared according to Examples 1 to 3 and Comparative Example 1 were evaluated by charging at a current of 5.0 C after charging and discharging at a current of 0.1 C. Results are summarized in Table 2 below.

TABLE 2

| | Charge capacity at 0.1 C (mAh/g) | Charge capacity at 5 C (mAh/g) | High-speed charge efficiency at 0.1 C/5.0 C (%) |
|---|---|---|---|
| Example 1 | 147.7 | 134.7 | 91.2 |
| Example 2 | 146.9 | 133.1 | 90.6 |
| Example 3 | 147.6 | 136.1 | 92.2 |
| Comparative Example 1 | 147.3 | 125.6 | 85.3 |

<Experimental Example 3> Lifespan Characteristics

Lifespan characteristics of a coin cell manufactured prepared using each of the lithium transition metal oxides prepared according to Examples 1 to 3 and Comparative Example 1 were evaluated by charging and discharging one-hundred times at a current of 1.0 C. Results are summarized in Table 3 below.

TABLE 3

| | Lifespan characteristics Discharge capacity (%) of $100^{th}/1^{st}$ |
|---|---|
| Example 1 | 96.8 |
| Example 2 | 96.7 |
| Example 3 | 97.4 |

TABLE 3-continued

| | Lifespan characteristics Discharge capacity (%) of $100^{th}/1^{st}$ |
|---|---|
| Comparative Example 1 | 91.8 |

As shown in the Experimental Examples 1 to 3, it can be confirmed that the coin cells according to Examples 1 to 3 manufactured using the precursors surface-treated with the predetermined metal have excellent battery characteristics such as initial charge and discharge characteristics and the like, when compared to the coin cell manufactured according to Comparative Example 1.

INDUSTRIAL APPLICABILITY

As described above, a cathode active material according to the present invention includes a predetermined lithium transition metal oxide, wherein hetero elements are located at surface portions of and inside particles of the lithium transition metal oxide, and thereby the cathode active material may be used without dramatic deterioration of electric characteristics even under high voltage, and, accordingly, a lithium secondary battery using the cathode active material may exhibit excellent high-speed charge and output characteristics, and high lifespan characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of preparing a lithium transition metal oxide, comprising:
    reacting a Mn—Ni-containing transition metal precursor with 0.001 to 0.9 mol % $M_{x'}A_{y'}$ to form a surface treated transition metal precursor,
    wherein M is at least one selected from the group consisting of Ti, Co, Al, Cu, Fe, Mg, B, Cr, Bi, Zn, and Zr;
    A is at least one selected from the group consisting of O, OH, $SO_4$, $PO_4$, $NO_3$, $CO_3$, $BO_3$, and F; and
    when 0<x'<4 and 0<y'<4, an oxidation number of M times x' plus an oxidation number of A times y' is 0;
    mixing the surface treated transition metal precursor with a lithium containing material; and
    sintering the mixture to form the lithium transition metal oxide based on Ni and Mn, wherein at least one hetero element selected from the group consisting of Ti, Co, Al, Cu, Fe, Mg, B, Cr, Bi, Zn and Zr is located at a surface portion of or inside the lithium transition metal oxide.

2. The method according to claim 1, wherein $M_{x'}A_{y'}$ is at least one selected from the group consisting of $TiO_2$, $Co_3O_4$, $Al_2O_3$, CuO, $Fe_2O_3$, $Fe_3O_4$, MgO, $B_2O_3$, $Cr_2O_3$, $Ti(SO_4)_2$, $CoSO_4$, $Al_2(SO_4)_3$, $CuSO_4$, $FeSO_4$, $MgSO_4$, $Ti_3(PO_4)_4$, $CoPO_4$, $AlPO_4$, $Mg_3(PO_4)_2$, $TiF_4$, $CoF_3$, $AlF_3$, $CuF_2$, $FeF_3$, $Al(NO_3)_3$ and $MgF_2$.

3. The method according to claim 1, wherein $M_{x'}A_{y'}$ dissolved in water or sodium hydroxide is added to a reactor.

* * * * *